Dec. 29, 1953  E. A. STALKER  2,663,996
ROTARY HYDRAULIC TORQUE CONVERTER
Filed March 26, 1949  4 Sheets-Sheet 1
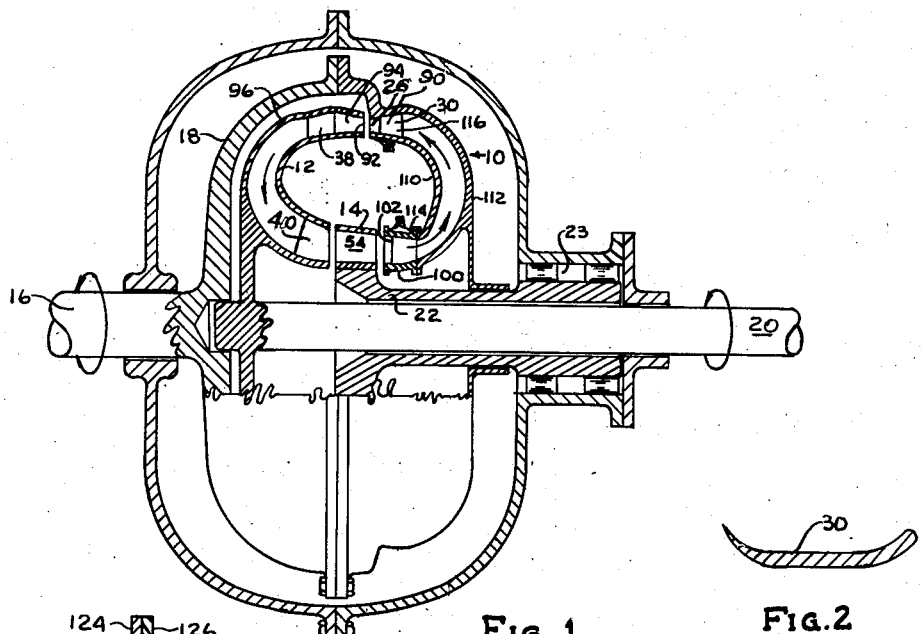
Fig. 1
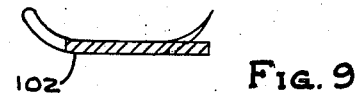
Fig. 2
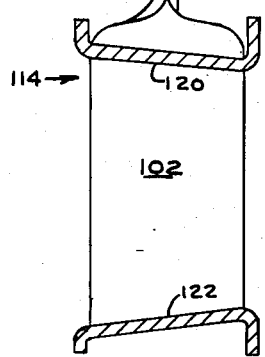
Fig. 5
Fig. 9
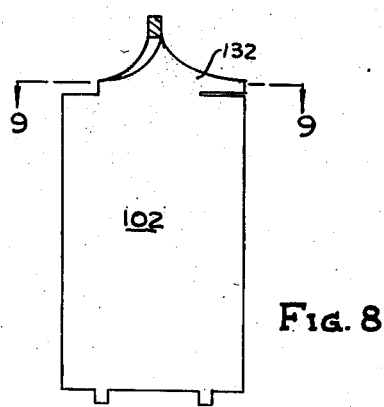
Fig. 8
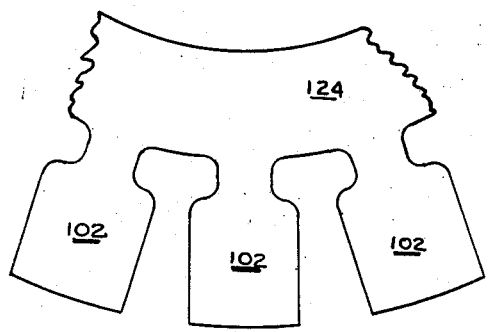
Fig. 6
INVENTOR.
Edward A. Stalker Dec. 29, 1953  E. A. STALKER  2,663,996
ROTARY HYDRAULIC TORQUE CONVERTER
Filed March 26, 1949  4 Sheets-Sheet 2

INVENTOR.
Edward A. Stalker

Dec. 29, 1953  E. A. STALKER  2,663,996
ROTARY HYDRAULIC TORQUE CONVERTER
Filed March 26, 1949  4 Sheets-Sheet 4

INVENTOR.
Edward A. Stalker

Patented Dec. 29, 1953

2,663,996

UNITED STATES PATENT OFFICE 2,663,996

ROTARY HYDRAULIC TORQUE CONVERTER

Edward A. Stalker, Bay City, Mich.

Application March 26, 1949, Serial No. 83,711

3 Claims. (Cl. 60—54)

My invention relates to fluid transmissions of the type employing rotatable bladed rotors.

An object of the invention is to provide a hydrokinetic type torque converter which is efficient over a wide range of torque magnification.

Another object is to provide a fluid type torque converter having a high magnification ratio for the number of reaction wheels employed.

Still another object is to provide a fluid transmission which has a wide range of operation when equipped with thin blades, especially blades made from sheet metal stampings.

Other objects will appear from the description, drawings and claims.

I accomplish the above objects by the means illustrated in the accompanying drawings in which—

Fig. 1 is a fragmentary axial section of one preferred form of the transmission;

Fig. 2 is a transverse section along line 2—2 in Fig. 10 of a blade of the pump wheel of Fig. 1;

Fig. 5 is an enlarged axial section of the pump wheel inlet of Fig. 1;

Fig. 6 is a fragment of a blade plate before the blades are twisted to a proper pitch angle;

Fig. 8 is a side view of one form of pump blade in Fig. 1;

Fig. 9 is section along line 9—9 in Fig. 8;

Figure 16:
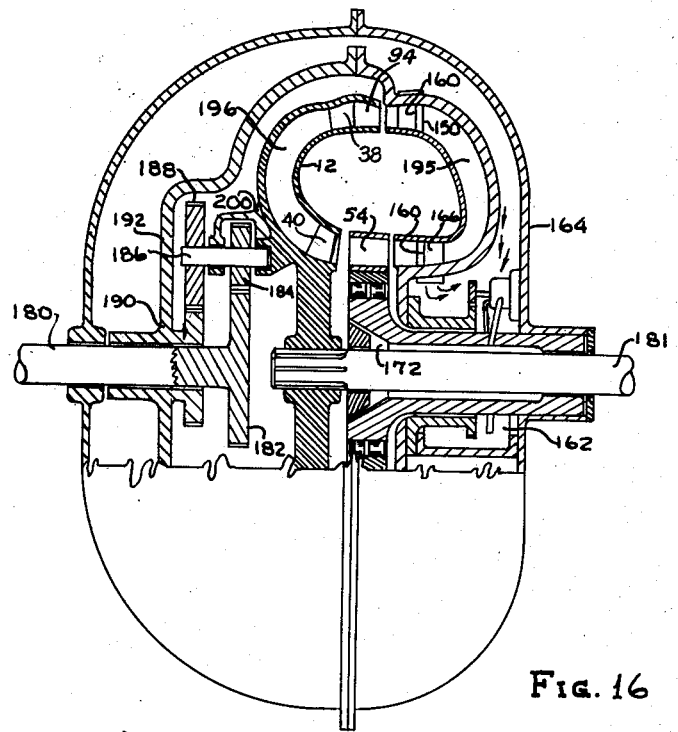
Fig. 16 is a fragmentary axial section of another form of the torque converter showing the incorporation of a gear unit.

In order to provide a low cost torque converter of the fluid type, it should be fabricated from sheet metal, preferably sheet metal stampings. However sheet metal blades normally will have a restricted range of efficient operation. That is the direction of the on-coming flow cannot make a very substantial angle with the blade without engendering turbulence which means lost energy of the flow.

In fact all fluid type torque converters suffer from the narrow range of angles of attack which can be accommodated, but this failing is greatly aggravated by the use of sheet metal or sharp edge blades. Hence if this type of fabrication is to be employed, it is necessary to provide means of mitigating the inherent limitation on angular range.

The lack of angular range exhibits itself in the passage of the fluid from the pump into the turbine while a still worse situation presents itself in the flow passing through the pump wheel.

The torque converter as shown in Fig. 1 comprises a fluid flow circuit including a pump wheel 10, a turbine wheel 12, and a reaction member 14. The pump wheel is fixed to the driving shaft 16 by the pump case 18. The turbine wheel is fixed to the driven shaft 20. The reaction member is supported on the stationary structure 22 by a free wheeling unit 23.

When the pump wheel is rotated fluid flows through the wheel out its exit 26 into the turbine wheel against which it exerts a force which provides the torque tending to rotate the turbine wheel and driven shaft. The same fluid flows continuously through the circuit formed by the wheel passages and provides for an interchange of energy between the wheels. See Figs. 1 to 12.

As shown in Fig. 2 the exit blades 30 of the pump wheel have a forward bend, that is they are bent in the direction of rotation. This forward bend provides that the fluid leaving the pump wheel attacks the blades of the turbine wheel with only a small variation in angle as the regime of operation changes. This is apparent from Figs. 3 and 4 which show fragmentary developments of the blades in the respective wheels.

Figure 3:
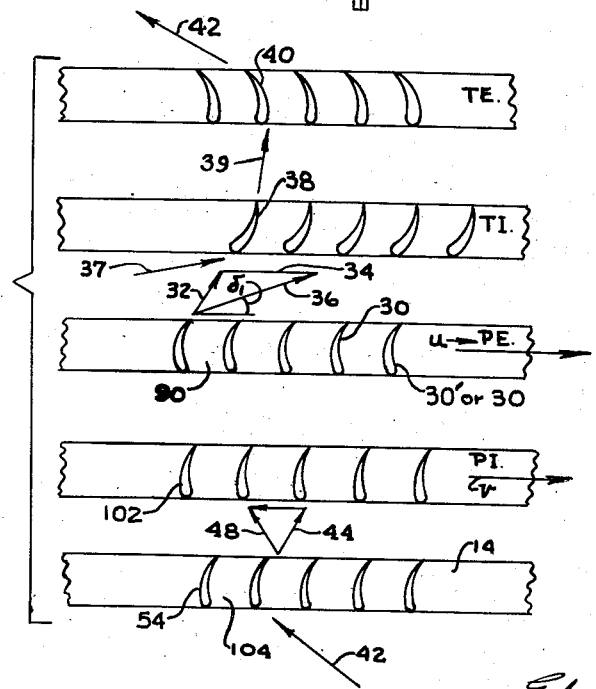
Fig. 3 is a fragmentary development of the blading of the wheels of Fig. 1 but not shown to scale.
Figure 4:
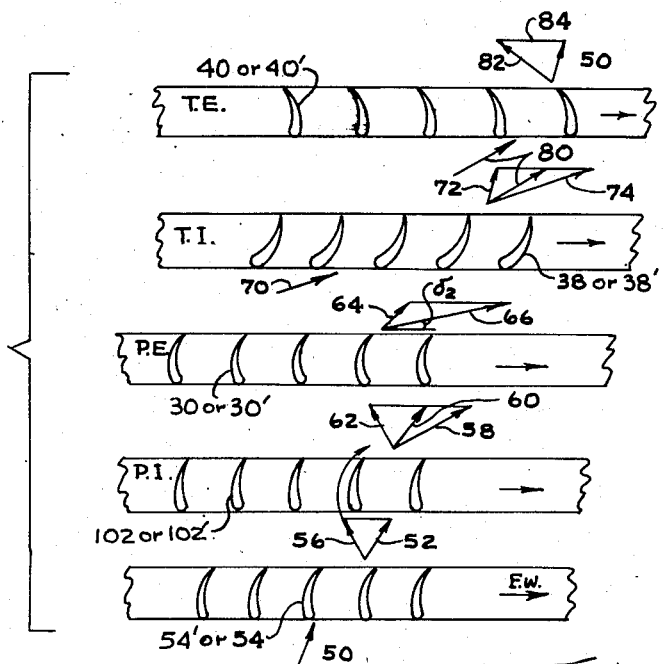
Fig. 4 is a fragmentary development of the blading of the wheels for a different regime of operation than that of Fig. 3.

In Figs. 3 and 4 the blades are given prime marks because the sections are not to scale.

The pump inlet and exit are designated respectively as P. I. and P. E. In like manner T. I. and T. E. apply to the turbine.

The peripheral speed of the blades of the pump wheel at exit is taken as a constant $u$ for the purposes of the present explanation. Fluid is discharged from the pump wheel and relative thereto with the vector 32. The wheel adds the velocity $u$ shown by vector 34 giving the resultant vector 36. If the turbine wheel is stationary as shown then vector 36 shows the direction of approach to the turbine inlet blades 38 and vector 39 shows the direction relative to the turbine exit blades 40. The fluid leaves along vector 42. The flow into the reaction wheel 14 has the same vector 42 repeated at the bottom of Fig. 3. The reaction wheel turns the flow to direction 44 which is the absolute direction since the wheel is locked through the free wheeling device. Then the vector relative to the pump inlet is 48 the pump inlet turning with peripheral velocity $v$ substantially less than $u$ because of the position nearer the axis than the exit.

When the turbine wheel turns at about pump wheel speed the fluid flow declines. Since the reaction wheel is attacked negatively by the vector 50 from the turbine wheel, the reaction wheel free wheels and the vector at the pump wheel is 52 approximately parallel to 50 but elongated and deviated somewhat by the axial acceleration in going through the converging passages between its blades 54. See Fig. 4.

The vector relative to the pump inlet is 56. The relative leaving vector is 58 giving the absolute leaving vector 60 and the relative approach vector 62 to the pump wheel exit blades. The fluid has the relative leaving vector 64 and the absolute vector 66.

The inlet vector relative to the turbine inlet is then 70. The relative and absolute leaving vectors are then 72 and 74 respectively. Then the inlet vector relative to the blades 40 of the turbine exit T. E. is 80 and the absolute leaving vector is 50, the resultant of vectors 82 and 84, the latter equal to $v$.

It will be clear from Figs. 3 and 4 that the forward bend of the trailing portion of the pump exit blades keeps the difference of the angles $\delta_1$ and $\delta_2$ to a low value so that the fluid attacks the blades of the turbine wheel at an angle that does not vary greatly. It is therefore possible to use thin blades at the turbine inlet.

The passages 90 between the blades 30 of the pump exit have a small radial convergence so that the exit area is somewhat less than the inlet area. This speeds up the flow in the passages and makes it possible for the fluid to accomplish the flow about the curved blades with very low losses even for relatively large angles of attack of the flow relative to these blades.

The fluid enters the turbine inlet 92 and is expanded in the inlet portion 94 which is expanding in area and radial depth by the outward divergence of the outer wall 96. The axial velocity of the fluid decreases so that the entrance vectors such as 37 and 70 decline in value and are positioned at a flatter angle with respect to the plane of rotation of the blades. This keeps the variation in angle of attack of the fluid on the blades to a low value for a wide range of operation of the torque converter. It reenforces the gain previously mentioned, from using pump blades with forward curved aft ends for the blades.

The pump also has a converging inlet portion 100 extending along about the chordwise length of the blades 102. This accelerates the flow while it is being turned by the blades and keeps fluid losses to a minimum.

A contracting inlet gives a reduction in losses if the blades terminate a short distance in from the passage inlet so that the high velocity engendered by the contraction does not bathe too much surface. If the blades extended far into the passage and were subjected to the high fluid velocity the frictional losses along the extended blade would vitiate the gains made along the curved initial portions.

The reaction wheel also has its passages 104 (Fig. 3) between blades reduced in cross sectional area so as to speed up the flow in passing therethrough.

As shown in Figs. 1 and 5 to 9 the pump wheel is fabricated from two toroidally cupped walls, the inner member 110 and the outer 112. These are fixed in spaced relation by the stages 114 and 116 of blades at the inlet and exit respectively.

Figure 7:
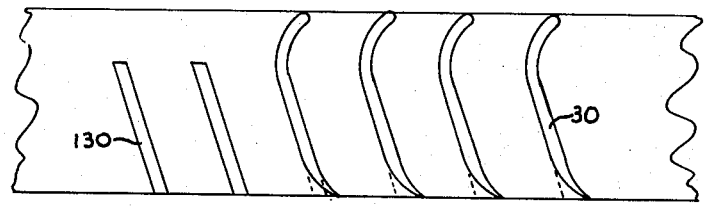
Fig. 7 is a fragmentary development of the blades and shroud of the inlet stage of the pump wheel in Fig. 1.

The inlet stage 114 is comprised of the blades 102 and the shrouds 120 and 122. The blades 102 are integral with a central plate 124 as shown in Figs. 5 and 6, the latter showing the blades in the unpitched state. Two similar plates 124 and 126 with their blades pitched are placed adjacent each other with the blades interdigitating to provide a wheel having overlapping blades as shown in Figs. 3, 4 and 7. Every other blade in Fig. 7 belongs to plate 124 and the others to plate 126.

The blades are inserted into the slots 130 from one edge. The chordwise straight root 132 of the blades as shown in Fig. 8 fills the slot. The side or leading and trailing portions of the blade are free of the root and curved as shown in Figs. 7, 8 and 9. The central portion of each blade is straight chordwise.

The assembly of blades and wall members are bonded together at the blade tips, preferably by heating the whole assemblage in a furnace with copper strips arranged at the joints to flow thereinto.

Figure 10:
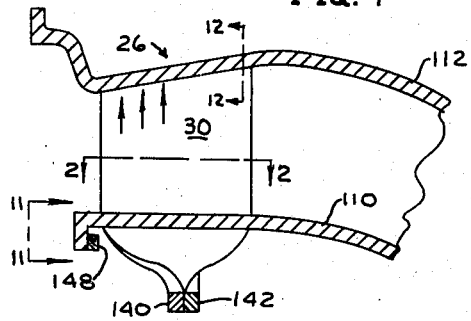
Fig. 10 is a fragment of an axial section of the stage of blades at the pump wheel exit in Fig. 1.
Figure 11:
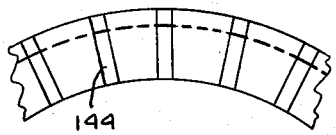
Fig. 11 is a fragmentary view along line 11—11 in Fig. 10.
Figure 12:
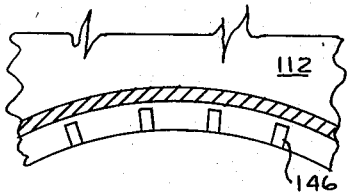
Fig. 12 is a fragmentary view along line 12—12 in Fig. 10.

The pump outlet blades 30 are also made integral with plates 140 and 142 as shown in Fig. 10. They are inserted into the walls 110 and 112 through the slots 144 and 146 which are shown in Figs. 11 and 12 extending rearward from the joggle in the outer wall 112. The slots in the inner wall are subsequently closed by the ring 148 bonded to the flange of the inner wall.

Figure 13:
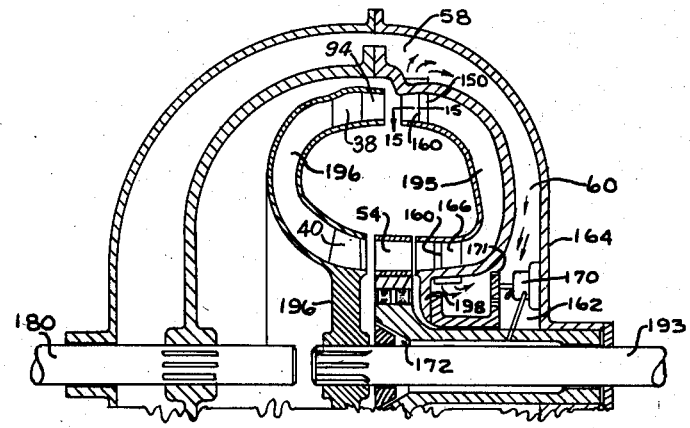
Fig. 13 is a fragmentary axial section of another form of the torque converter.
Figure 14:
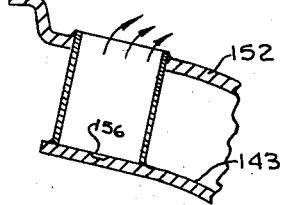
Fig. 14 is a fragment of the exit blading of the pump shown in axial section in Fig. 13.

Fig. 13 is another form of the invention wherein the pump outlet blades 150 are hollow and slotted as shown in Fig. 14. They are inserted through the pump wall 152 to butt against the wall 143. Suitable lugs 156 position the inner end of the blades on wall 154.

Instead of a slot in the blade wall it might be porous or pierced with small holes.

Figure 15:
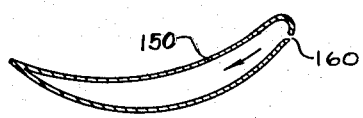
Fig. 15 is a chordwise section of the blades along line 15—15 in Fig. 13.

The blades are bonded in place preferably by brazing. They are closed at the inner end and open at the outer end. Thus fluid can enter the slots 160 (Fig. 15) and escape into the space 162 between the pump outer wall and the case 164.

The blades 166 at the inlet of the pump in Fig. 13 are constructed similarly to blades 150 and permit fluid from the slots to escape to space 162.

The fluid will escape to the space 162 because the pump 170 driven from the pump wheel by gear train 171 maintains a pressure within the converter to preclude the occurrence of cavitation. The pump withdraws fluid from the space 162 and discharges fluid into the fluid circuit via passage 172.

By use of the induction slots the blades can operate at very large angles of attack without separation of the flow from the blade surface, in other words without shock loss.

The blades 54 and the inlet portion 94 to the turbine in Fig. 13 are similar to the corresponding parts in Fig. 1. This is also true of Fig. 16.

Fig. 16 shows an application of gears to a converter of the radial flow type such as shown in Fig. 13. The drive shaft 180 has fixed to it the gear 182 in mesh with gear 184 rotatably mounted on the turbine by means of shaft 186. This shaft has fixed to it the gear 188 in mesh with gear 190 fixed to the pump wheel wall extension 192.

The web 196 (in Fig. 13) which joins the outer wall of the turbine to the shaft 193 is made separately and bonded to the turbine wall preferably by soldering with such materials as silver, copper or the like. The joint might also be made by mechanical means. In like manner the web 198 (Fig. 13) is bonded to the outer wall of the pump and the support 200 in Fig. 16 is bonded to the turbine wall.

When the input shaft 180 is turned without any load on the turbine or power output shaft 181, the pump and turbine wheels 195 and 199 respectively turn at substantially the same speed. However if the turbine wheel is stalled the pump wheel is turned at a rate greater than that of the input shaft 180. Furthermore the gear unit magnifies the turbine torque arising from the fluid flow so that the turbine is turned with increased torque. This follows because the force on the tooth of gear 184 in mesh with a tooth of gear 182 is also applied to the turbine by shaft 186.

While I have illustrated specific forms of the invention, it is to be understood that variations may be made therein and that I intend to claim my invention broadly as indicated by the appended claims.

I claim:

1. In combination in a fluid transmission, a radial flow pump wheel, a radial flow turbine wheel, means rotatably mounting said wheels for rotation about a common axis to define a fluid flow circuit through said pump wheel and said turbine wheel, said pump wheel having a plurality of peripherally spaced exit blades having their trailing edges substantially radial, said turbine wheel having a plurality of peripherally spaced inlet blades spaced a substantial distance downstream from the trailing edges of said pump blades, the leading edges of said turbine blades being substantially radial, said blades being within said circuit for the exchange of energy between said blades and fluid, the portion of said flow circuit between the trailing edges of said pump exit blades and the leading edges of said turbine wheel inlet blades extending along said axis to direct said fluid along the direction thereof and expanding in cross sectional area along the direction of said fluid flow, and the portion of said circuit along said turbine blades declining substantially in radial depth and cross sectional area to a locality a substantial distance downstream from the leading edges of said turbine blades to accelerate said flow of fluid therealong.

2. In combination in a fluid transmission, a radial flow pump wheel having a flow passage, a turbine wheel having a flow passage, means mounting said wheels for rotation about a common axis to define a fluid flow circuit through said pump and turbine wheel passages for the interchange of energy between said fluid and said wheels, said pump passage having an annular exit portion, a plurality of peripherally spaced pump blades positioned in said exit portion, each said blade having a substantial forward bend at the exit end thereof, each said blade having a chord length occupying a minor fraction of said pump passage length, the cross sectional flow area and transverse depth of said exit portion at the trailing edges of said blades being substantially less than at the leading edges of said blades, said exit portion decreasing in cross sectional area at a greater rate chordwise along said blades than along said pump passage ahead of said blades.

3. In combination in a fluid transmission, a pump wheel having a flow passage, a radial flow turbine wheel having a flow passage, said turbine passage being defined by walls continuous between the inlet and the exit thereof, means mounting said wheels for rotation about a common axis to define a fluid flow circuit through said pump and turbine wheel passages for the interchange of energy between said fluid and said wheels, said turbine passage having an annular inlet portion, a plurality of peripherally spaced blades positioned in said inlet portion, said blades having a chord length occupying a minor fraction of said turbine passage length, the cross sectional flow area and transverse depth of said inlet portion at the trailing edges of said blades being substantially less than at the leading edges of said blades, said inlet portion decreasing in cross sectional area at a greater rate chordwise along said blades than said turbine passage does downstream from said blades.

EDWARD A. STALKER.

References Cited in the file of this patent

UNITED STATES PATENTS

| Number | Name | Date |
|---|---|---|
| 1,199,360 | Föttinger | Sept. 26, 1916 |
| 1,760,480 | Coats | May 27, 1930 |
| 1,900,118 | Lysholm | Mar. 7, 1933 |
| 2,061,997 | Dunn | Nov. 24, 1936 |
| 2,074,170 | Dunn | Mar. 16, 1937 |
| 2,168,862 | Sensaud de Lavaud | Aug. 8, 1939 |
| 2,324,693 | Griswold et al. | July 20, 1943 |
| 2,371,589 | Salerni | Mar. 13, 1945 |
| 2,378,353 | Zeidler | June 12, 1945 |
| 2,388,329 | Jandasek | Nov. 6, 1945 |
| 2,428,134 | Zeidler | Sept. 30, 1947 |